United States Patent
Rustad

(10) Patent No.: US 7,130,915 B1
(45) Date of Patent: Oct. 31, 2006

(54) FAST TRANSACTION RESPONSE TIME PREDICTION ACROSS MULTIPLE DELAY SOURCES

(75) Inventor: Joseph Rustad, San Diego, CA (US)

(73) Assignee: Compuware Corporation, Detroit, MI (US)

( * ) Notice: Subject to any disclaimer, the term of this patent is extended or adjusted under 35 U.S.C. 154(b) by 633 days.

(21) Appl. No.: 10/043,824

(22) Filed: Jan. 11, 2002

(51) Int. Cl.
*G06F 11/30* (2006.01)
*G06F 15/173* (2006.01)

(52) U.S. Cl. .............. 709/232; 709/220; 709/223; 709/224; 703/19; 703/22; 370/229; 370/252

(58) Field of Classification Search ............... 709/217, 709/231–232, 234, 238, 220, 223–224, 219; 710/20, 29, 33, 56; 718/102; 711/167; 725/86; 370/403, 252; 717/4, 8–11; 703/19, 22–24; 707/2, 10
See application file for complete search history.

(56) References Cited

U.S. PATENT DOCUMENTS

| | | | |
|---|---|---|---|
| 5,754,831 A | 5/1998 | Berman | |
| 5,867,649 A * | 2/1999 | Larson | 709/201 |
| 5,884,028 A * | 3/1999 | Kindell et al. | 709/234 |
| 5,978,576 A | 11/1999 | Sanadidi et al. | |
| 6,061,722 A | 5/2000 | Lipa et al. | |
| 6,381,735 B1 * | 4/2002 | Hunt | 717/158 |
| 6,393,480 B1 * | 5/2002 | Qin et al. | 709/224 |
| 6,408,335 B1 * | 6/2002 | Schwaller et al. | 709/224 |
| 6,519,636 B1 * | 2/2003 | Engel et al. | 709/223 |
| 6,993,591 B1 * | 1/2006 | Klemm | 709/232 |

* cited by examiner

*Primary Examiner*—David Wiley
*Assistant Examiner*—Jude J Jean-Gilles
(74) *Attorney, Agent, or Firm*—Fenwick & West LLP

(57) ABSTRACT

This solution uses a statistical characterization of the transaction to predict the total effect on response time of each network component.

4 Claims, 5 Drawing Sheets

FAST TRANSACTION RESPONSE TIME PREDICTION ACROSS MULTIPLE DELAY SOURCES

BACKGROUND OF THE INVENTION

1. Field of the Invention

The present invention relates generally to the field of network performance analysis and specifically to the field of network application performance prediction.

2. Background of the Invention

A computer can send and receive information with another computer over a network. However, quickly predicting the response time of a single or multi threaded network application transaction, in a complex (non-trivial) network topology, has been difficult using conventional approaches. For example, predicting the response time of a given transaction using a given network has been done by using simulation or packet by packet analysis. However, simulation and packet by packet analysis use a significant amount of time and computing resources, and therefore do not quickly predict the response time.

SUMMARY OF THE INVENTION

This solution uses a statistical characterization of the transaction to predict the total effect on response time of each network component.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A fast transaction response time prediction across a network having multiple delay sources is disclosed. In one embodiment, a method of fast transaction response time prediction includes determining thread values associated with each thread of a plurality of threads, determining a delay value for a network, determining network flow factors, and determining a duration of each thread based on the thread values, the delay values and the network flow factors.

The method may use the thread values to predict an average response time for a thread based on a statistical representation of the thread. The method can use average packet sizes, with the averages calculated to obtain response times from an entire thread. For example, the thread values may be thread statistics such as an average size of a first packet and an average size of a last packet in a given direction, or ½ turn, of the thread. A benefit of the statistical thread values is that a transaction's response time can be calculated using statistical representations of each thread instead of using the complete details of the packets in each thread. This results in a vastly faster method without a significant loss in fidelity.

The network delay value may be based on network components that have variable delay times, and the variable delay times can be used in determining the transaction response time. For example, if the network includes multiple delay sources, where a delay time of a given delay source varies based on a packet's byte size, the variable delay times may be considered in determining the thread's response time. The method also permits using a histogram to statistically model flow control. The flow control statistics can be used in adjusting the thread values associated with a thread based on the delay caused by flow control parameters, such as TCP packets, for example. This adjustment causes the corresponding thread to act as if the TCP packets are included in the thread when the response time for the thread over the network is determined. Therefore, this solution can use a statistical characterization of the transaction to predict the total effect on response time of each network component.

Figure 1:
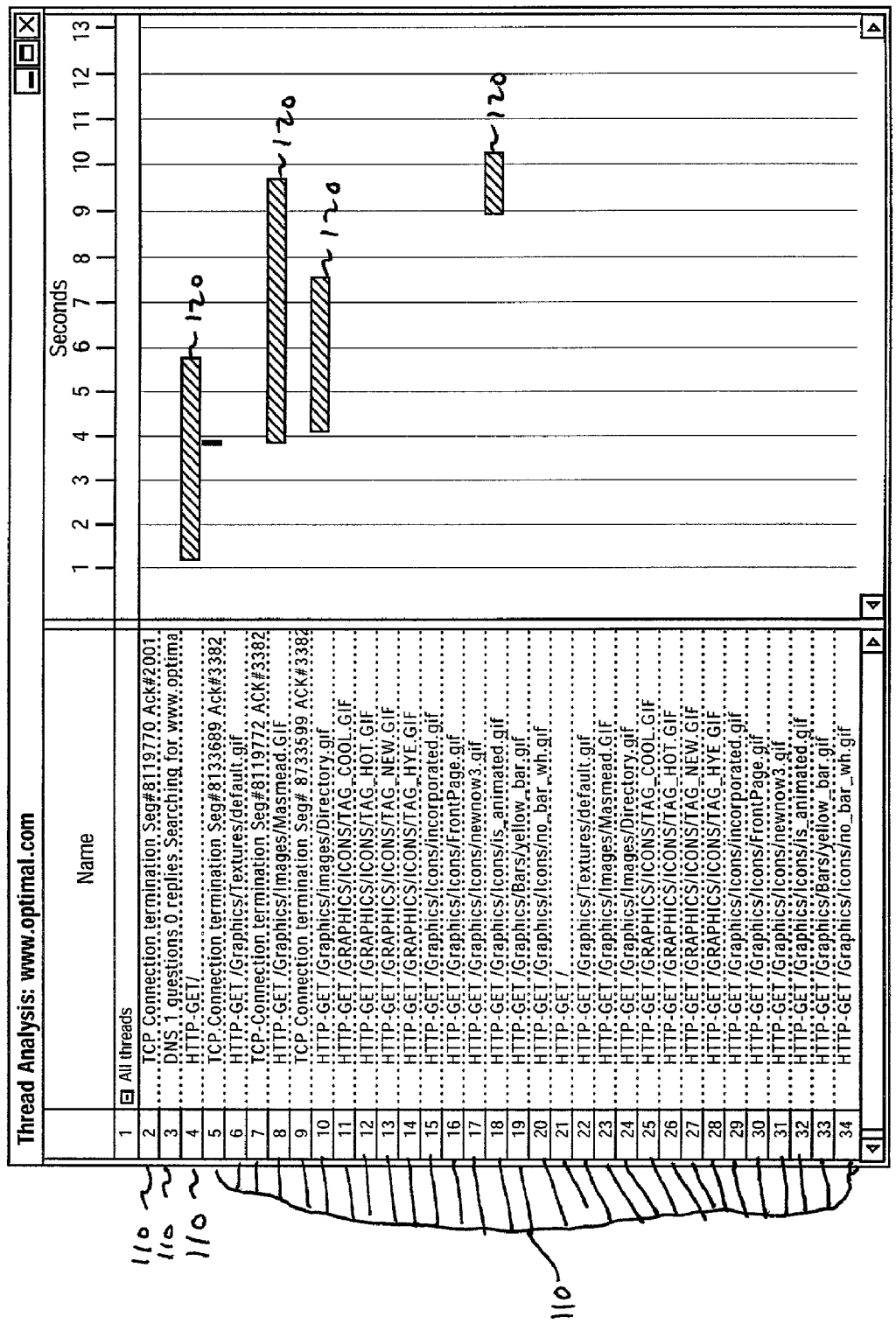
FIG. 1 shows a Gantt chart displaying an example of initial transactions times for threads of a transaction.
Figure 2:
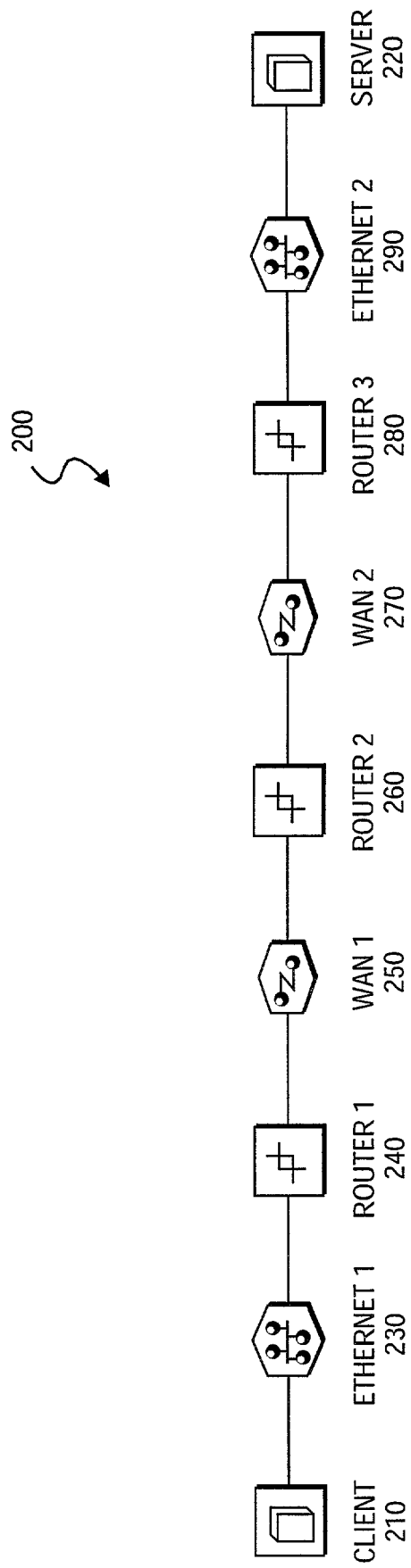
FIG. 2 shows an example of a network that allows a computer to perform a transaction with another computer.

As shown in FIG. 1, a transaction between a client, such as a browser for example, and a server, such as a website for example, is made up of several threads 110. The initial durations of the threads 120 on a test network are show on the Gantt chart 100. Referring to FIG. 2, a network 200 that can perform transaction 100 between two nodes, such as client node 210 and server node 220, is made up of multiple delay sources. In the example network shown in FIG. 2, the delay sources include links such as Ethernet 230, router 240, wide area network (WAN) 250, router 260, WAN 270, router 280, and Ethernet 290. The Ethernet and WAN links may be byte delay sources, because the service time, or delay time, of each Ethernet and WAN link depends on the number of bytes in a given packet that is processed by the link. Therefore, the delay time caused by these links varies as the byte size of each packet varies. The routers, depending on their type, may be byte delay or packet (constant) delay sources because some routers have a processing time, or delay time, that is constant for each packet, and some have a delay time that varies as the packet byte size varies.

Figure 3:
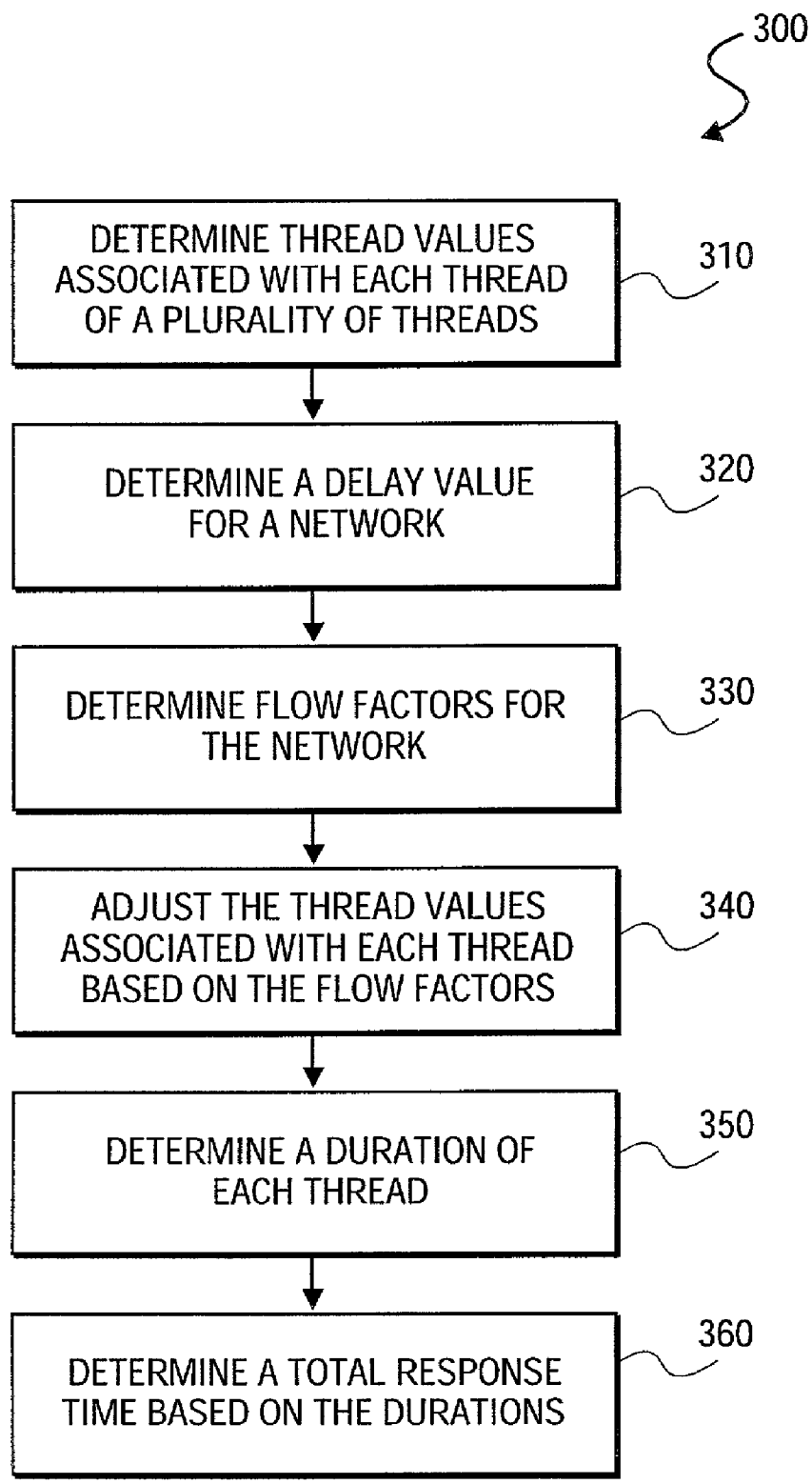
FIG. 3 shows an example of a method for determining the response time of the transaction of FIG. 1 over the network of FIG. 2.

FIG. 3 shows an example of one embodiment of a method 300 for determining the response time of the transaction 100 of FIG. 1 over the network 200 of FIG. 2. Thread values associated with each thread of a plurality of threads are determined, 310. For example, the thread values associated with each thread may include an average packet size and an average node sending time. A delay value for a network is determined, 320. For example, the network may include multiple delay sources, and the network delay value may be based on the source delay value of each of the multiple sources. Network flow factors are determined, 330. The network flow factors may be determined by generating a histogram of node sending time, and determining the network flow factors based on the histogram. The thread values associated with each thread may be adjusted based on the network flow factors, 340. For example, adjusting the thread values associated with each thread may include modifying a number of turns of the thread based on the flow factors. A duration of each thread based on the thread values, the delay value and the network flow factors is determined, 350. After a duration for each thread is determined, a total response time for the plurality of threads may be determined based on the durations of the threads, 360. This total response time is a prediction of the response time of the transaction over the network.

As shown in FIG. 3, thread values associated with each thread of a plurality of threads are determined, 310. For each thread of transaction 100, application related statistics are gathered. For example, the thread values associated with each thread may include an average packet size and an average node sending time. Thus, the transaction is characterized by statistics per thread. Before these application, or transaction, related statistics are determined, the zero payload transmission control protocol (TCP) packets are removed from the transaction. In this embodiment, only the TCP packets that have an empty payload are removed from the threads 110 of transaction 100. This removes the transaction response time of the empty TCP packets from the following calculations.

These statistics are therefore TCP independent. This gathering may occur only once, so that repetitive iteration may be avoided. The data gathered that is relative to transaction response time is per direction and per thread. The following statistics are also network independent, and can be determined from the characteristics of the transaction's performance in a test environment, for example. These application related TCP independent statistics include:

Application Bytes (bytes without zero payload TCP flow control packets)

Average Sized Last Packet, which is the average size of the last packet in every ½ turn in a given direction (the last packet in a stream of similarly directed packets before an opposite directed packet is sent).

Average Sized First Packet, which is the average size of the first packet in every ½ turn in a given direction.

Number of ½ Turns.

Number Of Packets

Total client think time and total server think time; where client think time is the processing time of the client between the reception of a last packet of a thread and the transmission of the first packet of the thread. Total client think time is the sum of all of the client think times, and total server think time is the sum of all server think times.

Average time between packets after the first packet in a ½ turn

A histogram of time between packets after the first packet in a ½ turn

Maximum time between packets after the first packet in a ½ turn

Figure 4:
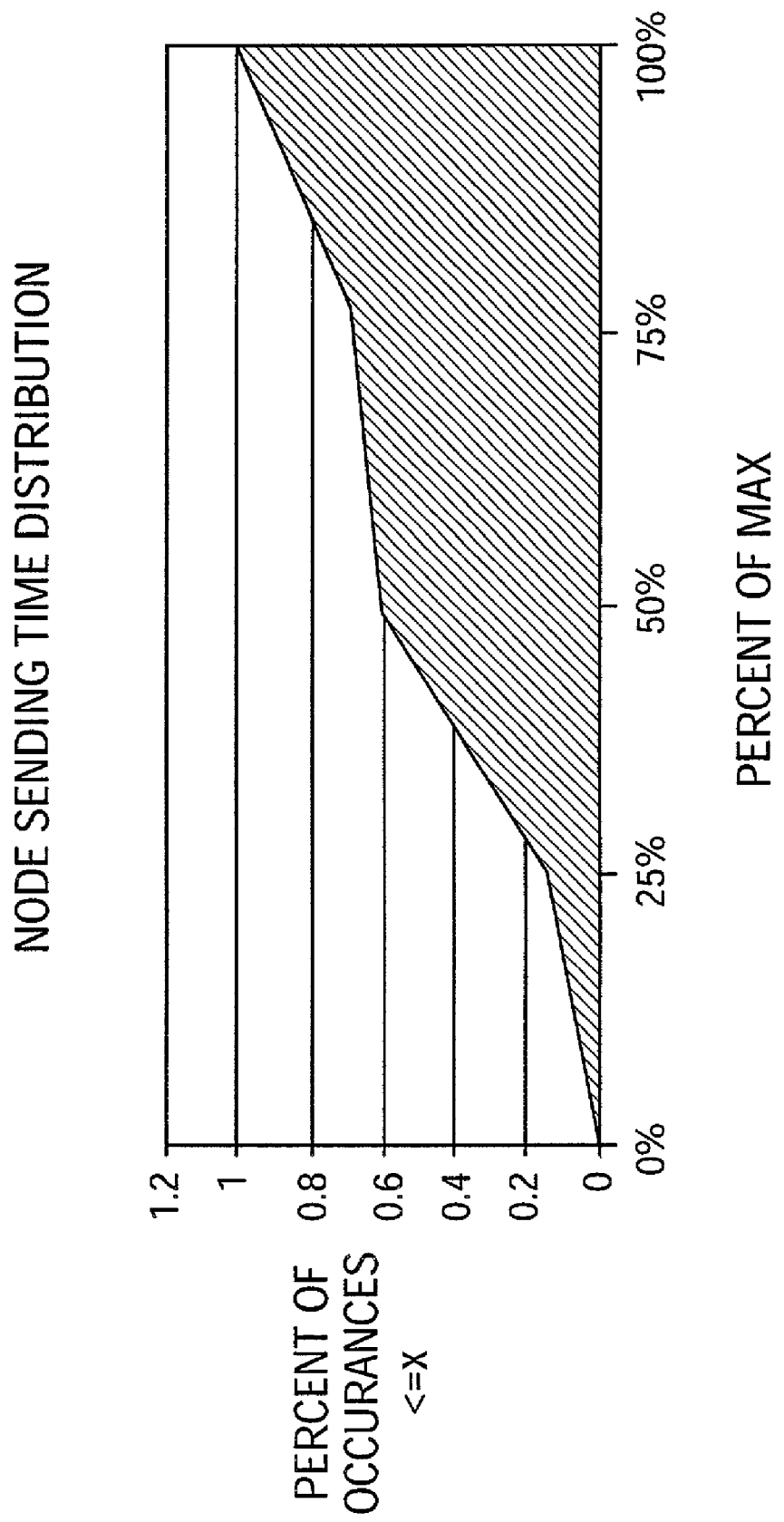
FIG. 4 shows an example of a histogram of a node sending time distribution for packets of a thread of a transaction.
Figure 5:
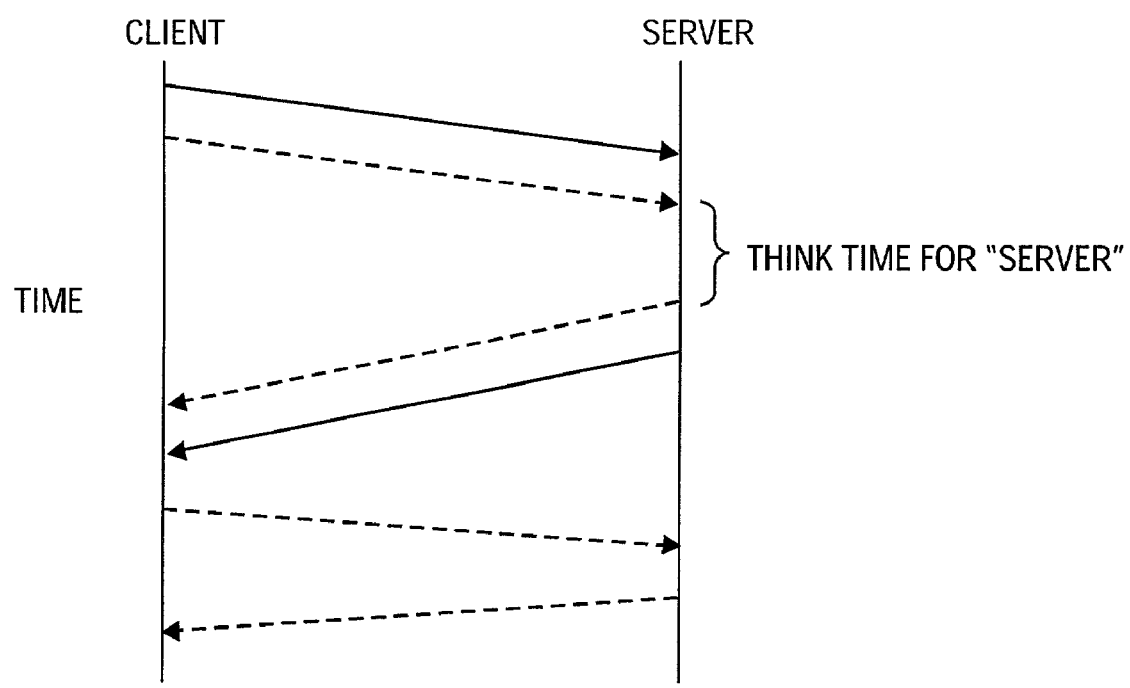
FIG. 5 shows an example of a half-turn/think-time diagram for a thread.

An example of a histogram of time between packets after the first packet in a ½ turn is shown in FIG. 4. The diagram of FIG. 5 illustrates examples of half turns and think times within a thread. One area of think time is labeled here. The dashed arrows occur with a half turn (an instance where the current packet is going a different direction that the previous one). A ½ turn is any occasion where the flow of packets (not including pure acknowledgement packets) changes direction. A ½ turn is associated with the direction the flow has changed to.

As shown in FIG. 3, a delay value for a network is determined, 320. The network may include multiple delay sources, and the network delay value may be based on the source delay value of each of the multiple sources. For example, route and per packet queuing delay statistics are calculated for the network. Thus, in addition to the application related TCP independent statistics, network related statistics are also gathered. These statistics can be determined from the characteristics of the network. For example, the network delays, such as node delays and queuing delays, may be measured, calculated from analytical formulas, or predicted from prediction methods. The network delays may be used to describe the network response time.

These network routing and queuing delay calculations may be considered parameters to the algorithm, and may include a queuing delay, a bandwidth delay, a byte delay, and a constant delay. The queuing delay for a given link, or node, measures the amount of time a packet spends at a queue waiting to be processed by the link. The delays may also include a bandwidth delay, which is caused by the bandwidth limit of the link or the network. The delays may also include a transmission delay, or constant delay, such as a delay between the transmission of a packet from one link until the reception of the packet at another link. Another delay may be a bottleneck delay, such as a byte bottleneck or a constant bottleneck. The bottleneck delay is determined by the network component that adds the most time to the end-to end delay time over the route of the network. A byte bottleneck delay is caused by a link that has a transmission time that is dependent on the size of the packets. It is possible that some packets may have a byte bottleneck (such as a link if the packets are large) and others may have a constant bottleneck (such as a router if the packets are small). However, the one network item that contributes the most time to the end-to-end delay time for an average sized packet that is used to determine the bottleneck delay time. The delay time may also be affected by the amount of traffic on the network.

The average delay for each delay source, including the queuing delay caused by utilization from the transaction(s) whose response time is being predicted, is determined at every delay source, and may be used as the network related statistics. The application related statistics and the network related statistics may be used to predict a total delay for different sizes of packets over multiple delay sources, including variable delay sources.

As shown in FIG. 3, flow factors for a network are determined, 330, and the thread values associated with each thread are adjusted based on the flow factors, 340. Thus, the statistics of each thread are adjusted for the TCP flow control effects. If a thread uses flow factors, such as TCP flow control parameters for example, the behavior and response time of the thread may vary depending on several network related factors that are related to TCP application data flow characteristics. These network related TCP factors include parameters such as: TCP window size for the network, round trip time of a packet from a first end to a second end and back to the first end of the network (rtt), and bottleneck bandwidth of the network. The TCP window size may be determined from the network TCP parameters, which include TCP window size. The round trip time may be determined by combining the total delay time between the client-end and server-end of the network in each direction for an average-sized packet. The bottleneck bandwidth is the link that has the largest delay time for an average-sized packet. The bottleneck bandwidth is equivalent to the effective bandwidth of the slowest delay source in the network path.

The application related statistics determined in block 310 of FIG. 3 may be modified by the network related TCP factors determined in block 330, to calculate two important numbers. For example, the application related statistics, such as: average time between packets after the first packet in a ½ turn (or the mean node sending time per node, where a node is the client or the server); the maximum time between packets after the first packet in a ½ turn (or the maximum node sending time per node); and the histogram of time between packets after the first packet in a ½ turn as shown in FIG. 4, (or the node sending time per node); along with the TCP related factors, may be used to calculate two important numbers, the probability of a short packet wait (PSPW), which is the probability that next packet will be put onto the TCP stack before an acknowledgement can come back, and the amount of time that the application spends waiting for TCP acknowledgements.

The probability that a packet would have to wait for an acknowledgment packet (PSPW) is the probability that the node sending time is less than the round trip time. This is approximated using the cumulative histogram for node sending time shown in FIG. 4, as follows. The probability that a packet wait (or node sending time) is shorter than or equal to x (where x is the packet round trip time) is the area under the cumulative distribution function (CDF) from 0 to x. The histogram of node sending time shown in FIG. 4 is comprised of three values: the percentage of sending times that are smaller than or equal to 25% of the max, those that are smaller than or equal to 50% of the max, and those that are smaller than or equal to 75% of the max node sending time in that direction. The histogram values for 0% and 100% are 0 and 1 respectively. Values are assumed to be uniform between points on the histogram, producing a Cumulative Distribution Function similar to the following: The probability that a packet wait is shorter than or equal to x is the value of the CDF (the area under the CDF curve) up to x. This area, which is the PSPW, can be calculated using simple geometry.

The amount of time spent waiting for TCP acknowledgements (TWTA) is based on the number of bytes in a thread, the Maximum Segment Size (MSS) of the network in question, the bottleneck speed of the network, the TCP window size, and the number of turns in the thread. A packet is one example of a segment. For each direction, add time based on how many full, or maximum-sized, segments may be transmitted, using the following recurrence relation:

$awnd$=minimum of $(pkt(x)/2+1$ and TCP window size)

$pkt(0)=2.$ $pkt(x+1)=pkt(x)+\text{floor}(awnd(x)/2)*2$ twta=0

Do the following While pkt(x)<Bytes/MSS:

Add max of (Round Trip Time−bottleneck time ((awnd(x)−2)*MSS), and zero) to the total of twta;
Next x Where:
bottleneck time (bytes) is equal to bytes in the current thread in a particular direction divided by bottleneck bandwidth;

x is a variable in the recurrence relation corresponding to a number of packets in a thread; pkt represents packet;

pkt(x) is the number of bytes of a pkt corresponding to a current value of x in a thread having x number of packets;

awnd represents actual window size;

awnd(x) is a value of awnd for a current value of pkt(x);

bytes/MSS is the number of bytes in a direction of a thread;

floor is a mathematical function that returns the largest integer value less than or equal to the supplied value; and max of (x, and zero) represents a value having a lower boundary of zero.

The time spent waiting for a TCP acknowledgement packet is divided by the Round Trip Time minus the number of application turns to determine an unadjusted number of turns added (UTA) because of TCP using the following equation:

$UTA=TWTA/(RTT-\text{\# of application turns}).$

The UTA may be constrained to a minimum of zero and a maximum of the number of packets minus the number of turns. Then, the constrained UTA is multiplied by the probability of a short packet wait. This yields:

Number of turns added=$PSPW*$(Constrained UTA).

This number of turns added is per direction. Therefore, for each turn in a given direction, the statistics calculated in block 310 are modified to include the effects of TCP flow control in the given network environment. Because extra packets and turns are added by TCP flow control effects, the characterization of each thread can be adjusted to include the effects of the additional TCP packets on the response time of the thread as shown in block 340 of FIG. 3. This adjustment may be made based on the number of additional turns as discussed above.

Therefore, adjusting the application related thread statistics to include the effects of TCP packets, as shown in block 340, may include adjusting the response time by adding the additional turns that are introduced to the thread by the effects of TCP. In addition to adding turns, TCP packets and delay times associated with the added turns may also be used to adjust the thread statistics. For example, adjusting may include adding TCP packets, such as acknowledgement packets for example, and adding the delays associated with each additional TCP packet, into the thread statistics of the packet sizes and sending times calculated in step two above. This adjustment causes the corresponding average thread to act as if the TCP packets were originally included in the thread when the response time for the thread over the network is determined. For example, if a TCP acknowledgement packet has minimum of 40 bytes for a frame, then, for each turn added by the flow factors, a thread's statistics may be adjusted to include the effects of the flow factors, as shown in block 340, by:

Averaging 1 packet of the average remaining packet size into the average size of the last packet; Adding 1 turn; Averaging 40 bytes into the average size of the last packet in the opposite direction; Adding 40 bytes to the opposite direction; Adding 1 turn in the opposite direction; and Removing the average node sending time under the rtt from the client time (or server time, whichever is the sending node). These adjustments are performed for each thread in the transaction.

The average node sending time under rtt can be approximated using the histogram of FIG. 4. The mean value less than or equal to a certain value is calculated using sections of the histogram. The mean in any distribution is defined as the sum of the value * the probability of that value occurring. Because a cumulative histogram is used, the sum for each section of the average value, times the probability a value in that section occurring, is determined. For the terminating section, a percentage of the weighted value, depending upon where in the section the rtt falls, is determined. Finally, this result is multiplied by the maximum encountered value (because the histogram deals with percentages of the max) and divided by the probability that a node sending time is less that rtt (because the probabilities recorded are for the entire set, and the mean value calculation is for the subset).

The average remaining packet size is the size of the non-first packets and is equivalent to (number of application bytes−(number of turns*average size of first packet)/(number of packets−number of turns)).

The network queuing delay statistics may be adjusted for the effect of the current transaction on the thread. Instead of using the delays directly as determined in block 320, an adjustment may be made to remove the current thread from the delays, because the queuing delays from block 320 of FIG. 3 include utilization caused by the current thread being predicted. The queuing delay adjustment for each thread is:

Queue time=Queue time*$(1-\rho_t/(1-\rho+\rho_t))$, where $\rho_t$ is the utilization of the delay source by the current thread and its immediate and non-immediate successors and predecessors, and $\rho$ is the overall utilization of this delay source.

The duration of each thread is determined, as shown in block 350 of FIG. 3. For example, an average response time for a thread may be determined based on an average size of a first packet and an average size of a last packet in a given direction, or ½ turn, over a network having multiple delay sources, where a given delay source may have a delay that varies from packet to packet relative to a variation in byte size among the packets. In one embodiment, the total response time of the transaction is calculated in parts for each thread: One for each direction, and total think time. The response time for a thread in each direction (from client-end to server-end, and from server-end to client-end) is calculated by applying the application related, network related, and TCP related values to the following formula:

Total response time for a thread in a given direction, or ½ turn, is equal to Number Of Turns*(End-to-Bottleneck Delay Time of Average Sized First Packet in the ½ turn (exclusive of the bottleneck delay)+Bottleneck to End Delay Time of Average Sized Last Packet in the ½ turn(inclusive of the bottleneck delay)+Bottleneck delay time*(Bytes per turn−Average Size of the Last Packet in the ½ turn−Round Trip Time of the Average Sized First Packet in the ½ turn))+(Number of Packets−*Number Of Turns)*(Bottleneck delay time(if constant)+Bottleneck Queuing Time+Client Think Time+Server Think Time.

Which is equivalent to: Total response time for a thread in a given direction Number Of Turns*(End-to-Bottleneck (exclusive) Delay Time of Average Sized First Packet+Bottleneck(inclusive)-to-End Delay Time of Average Sized Last Packet+(Number Of Packets/Number Of Turns−1)*(Total Bottleneck Time (including Bottleneck Queuing delay time) of average remaining packet))+Client Think Time+Server Think Time. These response times are per direction.

A total response time is determined based on the durations, as shown in block 360 of FIG. 3. For example, the durations of each thread can be combined to determine the total response time of the transaction over the network. The totals of both directions and the think time are added to create the total transaction response time. Thread start times are generated using thread dependency information, which takes thread overlap and thread parent-child relationship information into account. Once the thread response times are combined, the last thread end time is the total response time for the transaction.

The fast transaction response time prediction across multiple delay sources, including the embodiment shown in FIG. 3, and the other embodiments describe herein, may be performed by a computer processing system that has a computer readable memory and a computer processor. Furthermore, the system may include an input/output device to receive signals from a user and to output signals to the user. For example, the system may include a display screen to display images generated by the processor and output to the display screen, and a keyboard and mouse to receive commands, messages, or other input from a user. The memory may include computer readable instructions and a bus connection between the memory and the processor so that the processor can read the instructions stored in memory. The instructions, when executed by the processing system, cause the system to perform the method of fast transaction response time prediction across multiple delay sources. In another embodiment, the response time prediction across multiple delay sources as described herein may be performed by an electronic circuit that includes logic or circuitry that is configured to receive user input, perform the predicting functions, generate the result of predicting a transaction's response time, and display this result to a user. Also, a system that combines computer software stored in memory and executed by a processor, along with electronic circuitry such as logic, can be used to predict a transaction's response time.

A benefit of the present solution is that detailed results can be calculated using statistical representations of each thread instead of the complete detail of the packets in each thread. This results in a vastly faster algorithm without a loss in fidelity. The statistical modeling of flow control, which is achieved through the histogram, provides another benefit. Furthermore, this solution uses average packet sizes, with the averages calculated to obtain response times from an entire thread. It is the use of these averages across multiple turns to gain a high fidelity result that makes this solution a significant advance over conventional approaches.

The results achieved by this solution include determining response time of a transaction on a network, determining the duration and start time of each thread in the transaction, and showing a breakdown by network component of thread response time. Also, a breakdown by delay source type of thread response time can be provided. The solution also considers the delay caused by TCP in a thread when determining the total response time.

This solution has several advantages over conventional solutions. The time required to calculate the results are decreased by at least an order of magnitude, if not several (depending on the transaction). The memory required by the calculations is greatly reduced. The fidelity and solution space is increased greatly versus other conventional solutions, which do not support multiple delay sources.

These and other embodiments of the present invention may be realized in accordance with the teachings described herein and it should be evident that various modifications and changes may be made in these teachings without departing from the broader spirit and scope of the invention. The specification, summary, abstract, and drawings are, accordingly, to be regarded in an illustrative rather than restrictive sense and the invention measured only in terms of the claims.

I claim:

1. A method of predicting the performance of an application in a multi-hop network, the multi-hop network comprising a client and a server and having a path, the method comprising:

determining, for each thread of the application, a set of application factors corresponding to a set of functions performed by the application, the application factors being independent of the network and of a network flow control protocol, the application factors comprising average packet size and average node send time;

determining a set of network delay times corresponding to a series of network delay sources along the multi-hop network path, the network delay sources comprising a queuing delay, a bandwidth delay, a bottleneck delay, and one of a transmission delay, a constant delay, and a node delay;

determining a set of network flow factors corresponding to the network flow control protocol, the network flow factors comprising a number of turns added per direction, the direction relative to the client and the server, wherein said determining a set of network flow factors comprises generating a histogram of node send time and determining the number of turns added per direction based on the histogram;

determining a duration of each thread of the application based on the application factors, the network delay times and the network flow factors; and determining a total response time based on the durations of the threads.

2. An apparatus for predicting the performance of an application in a multi-hop network, the multi-hop network comprising a client and a server and having a path, the apparatus comprising:

means for determining, for each thread of the application, a set of application factors corresponding to a set of functions performed by the application, the application factors being independent of the network and of a network flow control protocol, the application factors comprising average packet size and average node send time;

means for determining a set of network delay times corresponding to a series of network delay sources along the multi-hop network path, the network delay sources comprising a queuing delay, a bandwidth delay, a bottleneck delay, and one of a transmission delay, a constant delay, and a node delay;

means for determining a set of network flow factors corresponding to the network flow control protocol, the network flow factors comprising a number of turns added per direction, the direction relative to the client and the server, wherein said means for determining a set of network flow factors comprises means for generating a histogram of node send time, and means for determining the number of turns added per direction based on the histogram;

means for determining a duration of each thread of the application based on the application factors, the network delay times and the network flow factors; and means for determining a total response time based on the durations of the threads.

3. A computer readable medium comprising computer readable instructions which, when executed by a processing system, cause the processing system to perform a method of predicting the performance of an application in a multi-hop network, the multi-hop network comprising a client and a server and having a path, the method comprising:

determining, for each thread of the application, a set of application factors corresponding to a set of functions performed by the application, the application factors being independent of the network and of a network flow control protocol, the application factors comprising average packet size and average node send time;

determining a set of network delay times corresponding to a series of network delay sources along the multi-hop network path, the network delay sources comprising a queuing delay, a bandwidth delay, a bottleneck delay, and one of a transmission delay, a constant delay, and a node delay;

determining a histogram of node send time;

determining a set of network flow factors corresponding to the network flow control protocol, the network flow factors comprising a number of turns added per direction, the direction relative to the client and the server, wherein the number of turns added per direction is based on the histogram;

determining a duration of each thread of the application based on the application factors, the network delay times and the network flow factors; and determining a total response time based on the durations of the threads.

4. An apparatus for predicting the performance of an application in a multi-hop network, the multi-hop network comprising a client and a server and having a path, the apparatus comprising:

application factor logic for determining, for each thread of the application, a set of application factors corresponding to a set of functions performed by the application, the application factors being independent of the network and of a network flow control protocol, the application factors comprising average packet size and average node send time;

delay time logic for determining a set of network delay times corresponding to a series of network delay sources along the multi-hop network path, the network delay sources comprising a queuing delay, a bandwidth delay, a bottleneck delay, and one of a transmission delay, a constant delay, and a node delay;

histogram logic for generating a histogram of node send time;

flow factor logic for determining a set of network flow factors corresponding to the network flow control protocol, the network flow factors comprising a number of turns added per direction, the direction relative to the client and the server, wherein the number of turns added per direction is based on the histogram;

first duration logic for determining a duration of each thread of the application based on the application factors, the network delay times and the network flow factors; and second duration logic for determining a total response time based on the durations of the threads.

* * * * *